United States Patent [19]
Bice et al.

[11] 3,884,881
[45] May 20, 1975

[54] PREPARATION OF POLY(P-PHENYLENE TEREPHTHALAMIDE) BY MIXING SOLUTION OF P-PHENYLENE DIAMINE WITH MOLTEN TEREPHTHALOYL CHLORIDE

[75] Inventors: Archie Robert Bice; James Allen Fitzgerald, both of Richmond; Alan Ellsworth Hoover, Chesterfield County, all of Va.

[73] Assignee: E. I. du Pont de Nemours & Company, Wilmington, Del.

[22] Filed: May 18, 1973

[21] Appl. No.: 361,818

[52] U.S. Cl............................................ 260/78 R
[51] Int. Cl............................................ C08g 20/20
[58] Field of Search.................................. 260/78 R

[56] References Cited
UNITED STATES PATENTS

| | | | |
|---|---|---|---|
| 2,562,796 | 7/1951 | Koch | 260/78 L |
| 3,040,005 | 6/1962 | Bernhardt et al. | 260/78 SC |
| 3,524,730 | 8/1970 | Yokouchi et al. | 260/78 R |
| 3,657,195 | 4/1972 | Doerful et al. | 260/78 SC |

Primary Examiner—Harold D. Anderson

[57] ABSTRACT

A highly efficient polymerization process for preparing poly(p-phenylene terephthalamide) involves recycling a portion of the reaction mixture stream within the polymerization chamber whereby the production of high molecular weight polymer at commercial throughput rates is facilitated.

2 Claims, 5 Drawing Figures

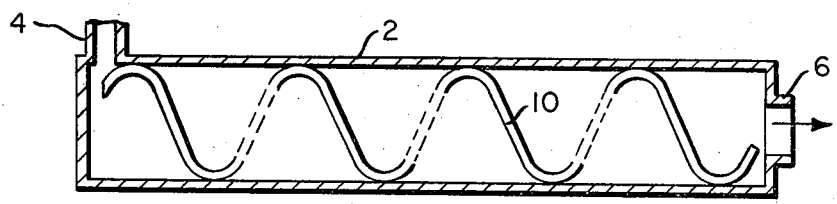
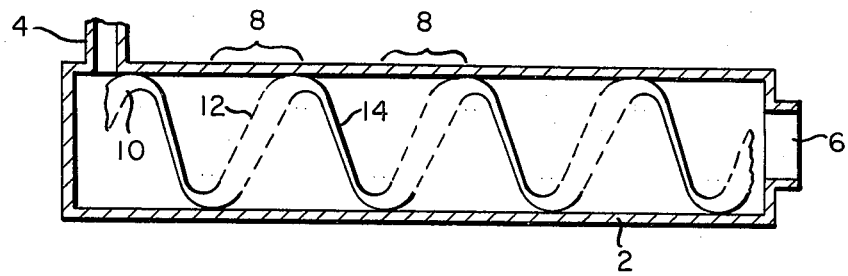
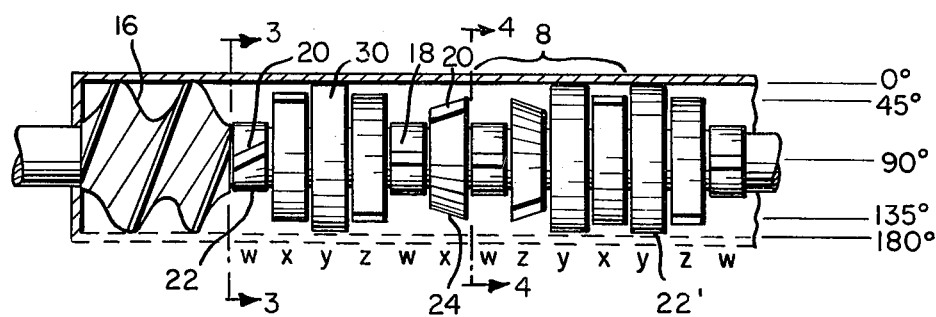
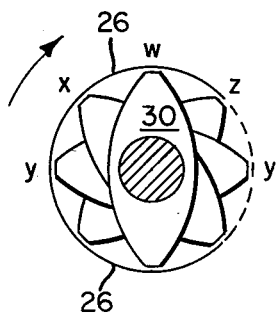
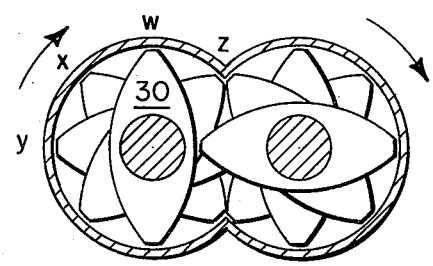

PREPARATION OF POLY(P-PHENYLENE TEREPHTHALAMIDE) BY MIXING SOLUTION OF P-PHENYLENE DIAMINE WITH MOLTEN TEREPHTHALOYL CHLORIDE

This invention relates to a novel process useful for the polymerization of certain condensation polymers.

BACKGROUND OF THE INVENTION

The preparation of wholly aromatic polyamides by the reaction of a diamine and a diacid halide in the presence of certain solvents for the reactants at temperatures below 100°C. is taught in U.S. Pat. No. 3,063,966 to Kwolek et al. In accordance with this Kwolek process, p-phenylene diamine and terephthaloyl chloride in hexamethylphosphoramide may be reacted. The initial reaction product which is a liquid containing low molecular weight polymer may be fed to an all surface-wiped high shear, continuous screw mixer to achieve polymerization and in which the reaction mixture passes from a liquid phase to a paste-like phase to a crumb-like phase. In the screw mixer, the ingredients are mixed and subjected to shearing stress while polymerization to high molecular weight polymer takes place. The crumb-like product is processed for preparation of spinning dopes by techniques known in the art.

The molecular weight of the polymer which can be obtained from the reaction mixture is found to be limited by the time that it remains in the screw mixer while undergoing polymerization. The retention time can be increased by increasing the length of the screw mixer or by restricting the exit by weir plates. The first method increases the cost; the second tends to increase the exit temperature of the product resulting in a lower molecular weight product due to temperature induced side reactions. It also requires an inordinate increase in the power required to mix and forward the product.

The present invention provides an improved continuous polymerization technique which will substantially mitigate the above difficulties and facilitate the production of high molecular weight polymer at commercial throughput rates. The polymer produced by the aforementioned process, namely, poly(p-phenylene terephthalamide) is useful in the spinning of high strength, high modulus fibers.

SUMMARY OF THE INVENTION

The present invention provides a novel continuous polymerization process. This process comprises passing the initial reaction mixture of a diamine and a diacid halide in a solvent into one end of an externally cooled polymerization chamber, mixing and shearing the product as it passes through said polymerization chamber, recycling a portion of the product stream as it travels through the polymerization chamber in a plurality of zones along the product flow path whereby the retention time of material in the polymerization chamber is increased, and withdrawing high molecular weight crumb-like product from the other end of the polymerization chamber.

Preferably the process is conducted on a mixture resulting from the initial reaction of substantially stoichiometric amounts of p-phenylene diamine and terephthaloyl chloride in the presence of hexamethylphosphoramide. This mixture is a liquid containing low molecular weight polymer. The polymerization is effected in the polymerization chamber while the product stream is sheared at a rate of at least 100 sec.$^{-1}$ preferably at least 225 sec.$^{-1}$. The shearing stress applied will exceed the yield stress whereby the sheared portion behaves as a fluid and the polymer molecular weight increases. The retention time of the product stream in the polymerization chamber is between 1 and 15 minutes preferably between 1 and 5 minutes. Preferably the product stream is uniformly cooled to result in an exit temperature not greater than 75°C. preferably not greater than 65°C.

BRIEF DESCRIPTION OF THE DRAWINGS

FIG. 1 is a diagrammatic illustration of the flow of material through a conventional twin-screw mixer.

FIG. 2 is a diagrammatic illustration of the flow of material in the twin-screw mixer in the process of this invention.

FIG. 3 is a schematic sectional view taken on line 3—3 of FIG. 5 looking from the entrance end of the twin-screw mixer. It shows an arrangement of paddles on one shaft of the mixer providing forward flow of material.

FIG. 4 is a schematic sectional view taken on line 4—4 of FIG. 5 looking from the entrance end of the twin-screw mixer. It shows an arrangement of paddles on one shaft of the twin-screw mixer which is located downstream of the paddle arrangement of FIG. 3 and which provides a means for recycling a portion of the forwardly flowing stream of material. FIG. 4 also includes the adjacent paddle section on the other shaft of the mixer and shows the surface-wiping mechanism.

FIG. 5 is a schematic top view of a portion of one screw of a twin-screw mixer showing the orientation of the paddles in the forwarding and recycling sections along the shaft.

DETAILED DESCRIPTION OF PREFERRED EMBODIMENTS

Suitable polymerizers for use with this invention are all surface-wiped continuous twin-screw mixers such as disclosed in U.S. Pat. Nos: 3,195,868, 3,198,491; and 3,618,902. Cooling means such as a jacketed body, hollow shafts and/or hollow mixing elements are preferably provided.

FIG. 1 diagrammatically depicts the flow 10 of material through a twin-screw mixer of the art from the entrance 4 to the exit 6. The width of the flow line 10 indicates a relatively uniform forward flow.

FIG. 2 diagrammatically depicts the flow 10 of a material in a twin-screw mixer in the process of this invention from the entrance 4 to the exit 6. It shows increased volume of material 12 that builds up in the recycling zone 8 and the decreased volume of material 14 immediately following the recycling zone.

FIGS. 3 and 4 are views taken on lines 3—3 and 4—4 respectively of FIG. 5 from the upstream or entrance end of one side of a horizontal twin-screw mixer of the art similar to that shown in U.S. Pat. No. 3,195,868. The arrows indicate direction of rotation. In FIG. 3 paddles 30 are oriented in the form of a short spiral about a common shaft to revolve in partial barrel 26 and advance the material from paddle W to X, Y and Z in sequence. The material is sheared between the tips of the paddles and the barrel and between the tip of a paddle and the side of its cooperating paddle rotating in the same direction in the adjacent barrel which is shown in FIG. 4. The letters Y, X, W and Z are used to designate the orientation of the paddles in 45° intervals.

FIG. 4 shows an arrangement of the paddles that provides for recycling in the process. There is more free volume behind the paddles than forward so the forward flow of the material is impeded, axial mixing is increased and retention time in the mixer is increased.

FIG. 5 is a diagrammatic top view of a part of a single barrel 26 of a twin-screw mixer showing the orientation of the tips of the paddles 30 corresponding to the designation and rotation of FIG. 3. The paddles may be straight paddles with an edge 18 parallel to the shaft of the mixer or they may be helical paddles with an edge oblique 20 to the shaft. In this embodiment the material is fed to a continuous screw section 16 and forwarded from section 22 by paddles W, X, Y, Z, W and X in sequence to the recycle zone 8 caused by the changed orientation of the paddles starting after section 24. At section 22' the material is again forwarded towards the exit.

Many arrangements can be used in the process of this invention. FIG. 5 shows combinations of 6 paddles oriented for forwarding followed by a section of 4 paddles providing a recycle zone. The use of other paddle arrangements will be obvious to those skilled in the art for forwarding the material stream through the mixer while providing for recycle zones.

PROCESS CONSIDERATIONS

The process is discussed below with reference to the polymerization of p-phenylene diamine and terephthaloyl chloride in the presence of hexamethylphosphoramide.

A stream of a solution of about 5 to 10 percent of p-phenylene diamine in hexamethylphosphoramide at a temperature as low as practical for solubility (e.g., about 10° to 30°C.) is intensively mixed with a jet stream of molten (85° to 120°C.) terephthaloyl chloride in stoichiometric proportions. The relatively thin (of the order of 100 centipoise) mixture is then forwarded within one second, preferably within 0.1 second, to a first polymerizer stage where it is intensely mixed with cooling for from 4 to 15 seconds. The partially polymerized product with a viscosity of about 10 to 100 poise and having a temperature of less than about 95°C. is then passed to the second polymerizer stage. In the second stage, the polymerization reaction product is submitted to intensive mixing for from 1 to about 15 minutes preferably 1 to 5 minutes characterized by a shear rate of at least 100 sec.$^{-1}$. The product is cooled while being mixed to provide an exit product temperature between about 40°C. and 95°C. The product is in the form of a dry crumb.

This invention is an improvement in the second polymerizer stage discussed above. It should be realized that the first and second stages could be carried out as one process.

Surprisingly the use of recycling zones in the flow through the polymerizer results in a lower product temperature than that obtained with an unimpeded flow and also requires significantly less power per pound to operate at a given average fill.

This invention is of particular advantage in the nonequilibrium polymerization of reaction mixtures that will yield products of from about 10 to 18 percent polymer in a polymerizer having an average fill (of the available free volume) of from about 20 to 50 percent. An additional advantage is a resulting increase in product uniformity and an additional increase in molecular weight (over that expected from increased retention time alone) due to the mass averaging from the axial mixing.

EXAMPLE

A stream of molten terephthaloyl chloride at 90°C. is impinged in a chamber on a stream of a solution (at about 16°C.) of 6.07 percent by weight of p-phenylene diamine in hexamethylphosphoramide in approximately stoichiometric amounts, the mass velocity (i.e., velocity X density) of each fluid stream being approximately equal. The hold-up time in the chamber is about 0.12 second.

The exit of the chamber is located immediately above the entrance of a continuous screw mixer (polymerizer) jacketed with cooling liquid. The conveyor blades of the mixer are opened to give a hold-up time of about 7.1 seconds. The product has a temperature of about 84°C. at the exit of the mixer and a polymer inherent viscosity of about 4 to 4.5.

A. The viscous liquid product from the above first stage polymerizer is fed directly to the entrance of a second stage polymerizer which is a continuous twin-screw mixer (Readco Continuous Processor 10 inches diam. - approx. 72 inches long) comprising a continuous screw feed section and a sequence of paddles to forward the product as shown in FIG. 3. The sequence of W, X, Y and Z orientation is followed for a total of 30 paddles followed by 2 X paddles and a final reversed helical paddle in the X orientation. All of paddles W, the first 5 of paddle X, the last 2 of paddle Z and the last of paddle Y are helical paddles with the wiping edge at an angle of about 30° to the shaft and pitched to drive material toward the exit. All other paddles (straight paddles) have wiping edges parallel to the shaft. The mixer shafts are rotated at 30 rpm. (giving a minimum shear rate at the tips of the paddles of about 120 sec.$^{-1}$). The retention time is about 120 seconds. About 11.7 percent of the available free space in the reactor is filled with the reaction mixture. The material stream is cooled (refrigerant at −20°F. is circulated through a central tube and surrounding annulus in the hollow shaft and also through a jacket surrounding the twin barrels) and the polymerization product, a dry crumb-like material containing 12 percent polymer, leaves the mixer at a temperature of about 55°C. The product has a yield stress of about 5.5 psi as measured with an Instron rheometer. Poly(p-phenylene terephthalamide) recovered from the crumb has an inherent viscosity of 4.9 as calculated from the viscosity of a solution of 0.5 gram of polymer in 100 ml. of concentrated sulfuric acid at 30°C.

B. The above procedure is repeated using the same reactant feed, mixer and first stage polymerizer as above but rearranging the paddles in the final polymerizer to provide recycling zones and using 5°F. refrigerant.

Using the designation of FIG. 3 the sequence of paddles following the continuous screw feed section with recycling zones designated as "r( )" follows: W*, X, Y, Z, W, X* r(W, Z*, Y, X*), Y, Z, W, X, Y*, r(X, W*, Z, Y*), Z, W, X, Y, Z*, r(Y, X*, W, Z*), W, X, X, X**. A single "*" and double "**" are used to designate helical paddles for forward and reverse flow respectively.

Rotating the mixer at the same speed as in B gives an average retention time of 245 seconds with about 24 percent of the available free space filled with reaction mixture. The product containing 12 percent polymer leaves the polymerizer at a temperature of about 50°C. Polymer recovered from the crumb has an inherent viscosity of 5.8.

C. Another arrangement of the paddles in the above polymerizer using only 5 paddles in each driving section starting with W*, X, Y, Z, W* followed by 3 paddles in each recycling zone Z, Y and X etc. provides 4 recycle zones. Using the reactant flow rate of A and B and rotating at the same speed a 43 percent fill is obtained with a retention time of 445 seconds to provide a dry crumb product at 53°C. containing 12 percent polymer of 5.7 inherent viscosity.

The products of the above polymerizations are treated by the same recovery process of: grinding, neutralization, washing, colloid mill, filtering and drying. The dried polymers contain a small amount of extremely hard particles of polymer larger than 20 mesh which are more difficult to dissolve than the other polymer and are discarded. The products from polymerization A, B and C above contain about 7, 2 and 1 percent respectively by weight of these coarse particles. These coarse particles are lower molecular weight polymer and indicate a lack of sufficient mixing (channeling through the polymerizer).

The torque in inch-pounds to operate the polymerizers divided by the weight in pounds of reaction mixture in the polymerizer was 425, 220 and 144 respectively for A, B and C above.

What is claimed is:

1. In a process wherein a solution of p-phenylene diamine and hexamethylphosphoramide is mixed with molten terephthaloyl chloride and the resulting mixture is forwarded within one second to a first polymerizer where it is mixed with cooling to yield a partially polymerized product having a viscosity of from about 10 to 100 poises and a temperature of less than about 95°C. and said product is then passed to an externally cooled second polymerization chamber, the improvement comprising introducing said partially polymerized product into one end of said second polymerization chamber and forwarding it to the exit of the chamber while mixing and shearing it at a rate of at least 100 sec.$^{-1}$ as it passes through said polymerization chamber, recycling a portion of it as it flows towards the exit of the polymerization chamber in a plurality of zones along the flow path whereby the retention time of the recycled material in the polymerization chamber is increased beyond the time it would have remained in the chamber in the absence of recycling, and withdrawing a crumb-like product containing high molecular weight poly(p-phenylene terephthalamide) from the exit of the polymerization chamber, the said material stream being retained in the polymerization chamber for from 1 to 15 minutes and being uniformly cooled to result in an exit temperature between about 40°C. and 95°C.

2. The process of claim 1 wherein the product stream is uniformly cooled in the polymerization chamber to result in an exit temperature not greater than 75°C.

* * * * *